Jan. 16, 1951     J. W. KASMEYER     2,538,459
FISH LURE
Filed April 21, 1950
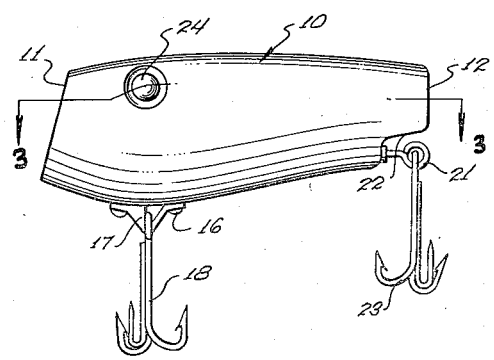
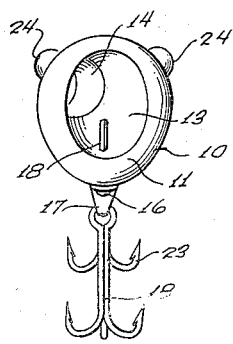
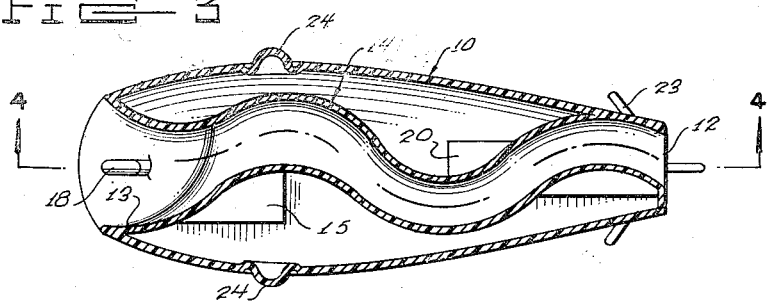
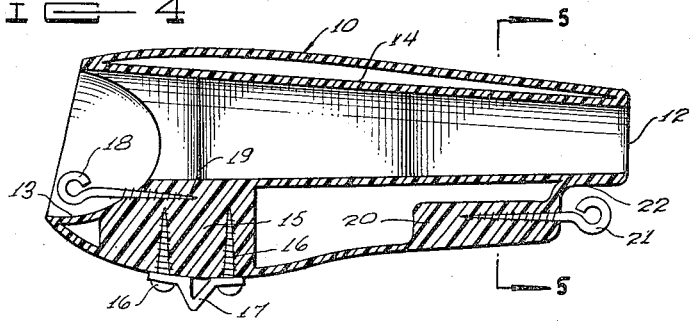
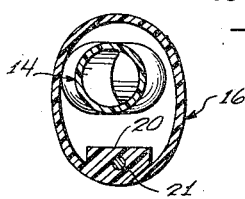
INVENTOR.
JOHN W. KASMEYER
BY
McMorrow, Berman & Davidson
ATTORNEYS Patented Jan. 16, 1951

2,538,459

UNITED STATES PATENT OFFICE 2,538,459

FISH LURE

John W. Kasmeyer, Yonkers, N. Y.

Application April 21, 1950, Serial No. 157,340

5 Claims. (Cl. 43—42.06)

My invention relates to a fish lure.

A primary object of the invention is to provide a fish lure having novel means for causing the lure to simulate the motion of a swimming fish when it is pulled through the water.

A further object is to provide a fish lure of the above-mentioned character which is substantially unitary and adapted to be molded from a suitable plastics material.

A further object is to provide a fish lure having an internal, tortuous passage through which the water passes when the lure is being reeled in, or during trolling or the like, for causing the lure to move in a zigzag fashion to simulate the movement of a live fish.

A still further object is to provide a fish lure or plug which is light, and which has a high degree of buoyancy, the lure being highly simplified in construction, compact, neat and attractive in appearance, and sturdy and durable.

Other objects and advantages of the invention will be apparent during the course of the following description.

In the accompanying drawings forming a part of this application, and in which like numerals are employed to designate like parts throughout the same:

Figure 1 is a side elevational view of a fish lure embodying my invention;

Figure 2 is a front end elevational view of the same;

Figure 3 is a horizontal, longitudinal section taken on line 3—3 of Figure 1;

Figure 4 is a central, vertical, longitudinal, sectional view taken on line 4—4 of Figure 3; and Figure 5 is a transverse, vertical, sectional view taken on line 5—5 of Figure 4.

In the drawings, where, for the purpose of illustration, is shown a preferred embodiment of the invention, the numeral 10 designates generally a lure body portion or shell which is elongated and substantially oval-shaped in transverse cross-section. The body portion or shell 10 is wider near its forward end than at the rear end thereof, and the body portion 10 tapers longitudinally rearwardly, as shown in Figures 3 and 4. The forward end 11 of the body portion 10 is truncated, substantially straight, and arranged at a slight rearward inclination with respect to the vertical. The rear end 12 of the body portion is likewise truncated, substantially flat and vertically disposed, Figure 1. As shown best in Figures 2 and 5, the lure body portion 10 is rounded at its sides and at its top and bottom throughout substantially its entire length, it having been previously stated that the lure is oval-shaped in cross-section.

The body portion or shell 10 is substantially hollow, so that the lure will have a high degree of buoyancy and also be very light. The forward end 11 is open and provided with a deep, concave or rounded recess 13 extending for substantially the entire width and height of the lure adjacent to its forward end, Figures 3 and 4. The body portion or shell 10 is provided internally with a relatively narrow, elongated, generally longitudinal tube 14 extending throughout the entire length of the lure and integrally connected with the shell or body portion 10 at the forward and rear ends 11 and 12, as shown. As best shown in Figure 3, the tube 14 is horizontally and longitudinally curved in a zigzag fashion between the forward and rear ends 11 and 12. Also, the tube 14, which is circular in transverse, cross-section, has its diameter gradually decreasing toward the rear end 12 throughout its entire length. The arrangement is such that the tube 14 forms a longitudinally rearwardly tapering, elongated passage or channel which zigzags horizontally from the forward open end 11 to the rear end 12, so that when the lure is drawn through the water during trolling, reeling in or the like, the water flowing through the tube 14 will have its direction of flow changed horizontally several times between the forward and rear ends of the lure. This will cause the lure to wriggle horizontally in a manner which closely simulates the movement of a live swimming fish. As clearly shown, the rear end of the tube 14 opens through the rear end 12.

As shown in Figure 4, the tube 14 is substantially straight with respect to the vertical and arranged slightly above the vertical center of the body portion 10. The forward end of the tube 14 opens into the large, forward, concave recess 13 near the top of such recess and toward one side of the same, Figure 2. The body portion or shell 10 and the zigzag tube 14 constitute an integral or unitary construction well adapted to be molded from plastics material.

As previously stated, the body portion or shell 10 is substantially hollow, so that a substantially continuous air space exists between the shell 10 and zigzag tube 14, as shown. Near the forward end of the lure and below the tube 14, an internal block or boss 15 is integrally connected with the bottom of the tube 14 and the bottom of the shell 10. This internal boss 15 provides sufficient material for firmly anchoring or securing a pair of upwardly directed attaching screws 16 which are arranged at the transverse center of the shell 10 and spaced apart longitudinally, as shown. The screws 16 serve to rigidly secure a substantially V-shaped fishhook attaching eye or plate 17 to the bottom of the shell 10 near the forward end thereof. A multiple-type, depending fishhook 18 is pivotally suspended from the eye 17 at the bottom of the lure, Figures 1 and 2. A suitable line-attaching eye 18 has its screw-threaded shank 19 anchored within the boss 15 above the screws 16, and this eye 18 is disposed at the transverse center of the shell 10 and preferably vertically disposed, Figure 2. The forward tip of the eye 18 is preferably substantially flush with the truncated, forward end 11, Figure 4, and the eye 18 is disposed within the concave recess 13 and below the forward, open end of the tube 14.

The shell 10 is provided near its rear end and at its bottom with a second internal, solid projection or boss 20, integrally secured thereto. This boss 20 has its top spaced below the bottom of the tube 14, Figure 4, and is preferably only thick enough to accommodate the screw-threaded shank of a rear fishhook-attaching eye 21, which is disposed in a bottom recess or notch 22 formed in the rear end 12 and bottom side of the casing 10, as shown. A second multiple-type fishhook 23 is pivotally connected with the eye 21 and freely suspended therefrom. As shown in Figure 1, the fishhook 23 is disposed at an elevation above the forward fishhook 18 and arranged adjacent to the rear vertical end 12.

The shell 10 is formed near and longitudinally rearwardly of its forward end and near its top with laterally oppositely disposed, substantially hemispherical projections or beads 24 integral therewith, and these beads 24 simulate the eyes of a fish. The over-all shape of the casing 10 is such that it simulates generally the shape of a small fish, and the outside surface of the casing 10 may be colored and provided with other suitable ornamentation, as desired. The body portion or casing 10, as well as the tube 14, is thin walled so that the lure is quite light.

In use, the fishing line or a leader is attached to the eye 18, and the lure may be drawn through the water during trolling, reeling in or the like. Since the casing 10 is substantially hollow and very light, the lure will have a high degree of buoyancy and will travel near the surface of the water. I have found that during a fast retrieve or reeling in, the lure darts back and forth just below the surface of the water. As the lure is pulled forwardly, water will enter the forward concave recess 13 and pass freely into and through the zigzag tube 14. In so passing, the water will impart a lifelike, horizontal zigzag movement or wriggle to the lure simulating the lifelike movements of a fish. The lure will travel generally in a straight line with respect to the vertical, since the tube 14 is substantially straight with respect to the vertical, Figure 4. However, when the inrushing water impinges upon the surface of the concave recess 13, a further slight twisting or wriggling movement is imparted to the lure, since the forward open end of the tube 14 is eccentrically located with respect to the recess 14, Figure 2. The faster the lure is pulled through the water, the faster the zigzag wriggling movement will be. I contemplate making my lure in a wide variety of sizes and colors, and I also contemplate varying the number and disposition of the fishhooks.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described my invention, I claim:

1. A fish lure comprising a unitary substantially hollow casing having forward and rear ends provided with openings, an elongated relatively narrow zigzag tube mounted within the casing and connected with the casing and leading from the opening in the forward end of the casing through the opening in the rear end thereof, a fishhook connected with the casing, and line-attaching means carried by the casing.

2. A fish lure comprising an elongated substantially hollow casing having forward and rear ends, an internal zigzag tube for the casing and extending for substantially the entire length of the casing and spaced from the side wall of the casing, the tube being connected with the casing at its forward and rear ends, the forward and rear ends of the tube opening through the corresponding ends of the casing, a fishhook connected with the casing, and line-attaching means secured to the casing near its forward end.

3. A unitary fish lure comprising an elongated substantially hollow body portion having forward and rear ends provided with openings, an elongated relatively narrow zigzag tube mounted within the body portion and spaced from the side wall of the body portion and integrally connected therewith at the forward and rear ends of the body portion, the zigzag tube extending for the entire length of the body portion and having its forward and rear ends in registration with the openings of the forward and rear ends of the body portion, the tube being substantially straight with respect to the vertical, line-attaching means connected with the body portion near its forward end, and fishhook means carried by the body portion.

4. A fish lure comprising an elongated substantially tubular casing having forward and rear ends, the forward end of the casing being provided with a concave recess, an elongated substantially horizontally zigzagged tube mounted within the tubular casing and spaced from the side wall of the casing and integrally connected therewith at the forward and rear ends of the casing, the tube having its forward and rear ends opening through the forward and rear ends of the casing, fishhook means mounted upon the casing, and a line-attaching eye secured to the casing and disposed within the concave recess.

5. A fish lure comprising an elongated substantially hollow casing having forward and rear ends, an elongated relatively narrow zigzagged tube mounted within the casing and extending for substantially the entire length of the casing and spaced from the side wall of the casing, the tube being secured to the casing at the forward and rear ends of the casing and tube, the casing being provided in its forward end with a large concave recess, the forward end of the tube intersecting the concave recess at a point eccentric with respect to the longitudinal axis of the casing, the rear end of the tube opening through the rear end of the casing, the casing being provided with an internal boss, a line-attaching eye disposed within the forward concave recess and anchored within the internal boss, and fishhook means connected with the casing and anchored within the internal boss.

JOHN W. KASMEYER.

REFERENCES CITED

The following references are of record in the file of this patent:

UNITED STATES PATENTS

| Number | Name | Date |
|---|---|---|
| 1,848,704 | Farley | Mar. 8, 1932 |

FOREIGN PATENTS

| Number | Country | Date |
|---|---|---|
| 337,616 | Great Britain | Nov. 6, 1930 |
| 820,776 | France | Nov. 18, 1937 |